(12) United States Patent
Koodli (10) Patent No.: US 7,277,388 B1
(45) Date of Patent: Oct. 2, 2007

(54) METHOD AND APPARATUS FOR RANDOM PACKET MARKING FOR DIFFERENTIATED SERVICES

(75) Inventor: Rajeev Koodli, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/540,361

(22) Filed: Mar. 31, 2000

(51) Int. Cl.
*H04L 12/28* (2006.01)
*H04L 12/66* (2006.01)

(52) U.S. Cl. .................. 370/230.1; 370/235; 370/356; 370/395.21; 370/416

(58) Field of Classification Search ........ 370/229–235, 370/395.21, 258, 253, 465, 468, 414, 416, 370/429
See application file for complete search history.

(56) References Cited

U.S. PATENT DOCUMENTS

| | | | |
|---|---|---|---|
| 4,769,810 A * | 9/1988 | Eckberg et al. ............. 370/232 |
| 5,136,592 A | 8/1992 | Weng | |
| 5,434,848 A * | 7/1995 | Chimento et al. .......... 370/232 |
| 5,524,116 A | 6/1996 | Kalmanek, Jr. et al. | |
| 5,790,521 A * | 8/1998 | Lee et al. ................... 370/230 |
| 5,790,974 A | 8/1998 | Tognazzini | |
| 6,011,776 A * | 1/2000 | Berthaud et al. ........... 370/232 |
| 6,128,282 A * | 10/2000 | Liebetreu et al. ........... 370/235 |
| 6,167,379 A | 12/2000 | Dean et al. | |
| 6,188,698 B1 * | 2/2001 | Galand et al. .............. 370/412 |
| 6,252,848 B1 * | 6/2001 | Skirmont .................... 370/229 |
| 6,333,917 B1 * | 12/2001 | Lyon et al. ................. 370/236 |
| 6,463,068 B1 * | 10/2002 | Lin et al. .................... 370/414 |
| 6,496,515 B2 * | 12/2002 | Lefebvre et al. ............ 370/455 |
| 6,515,963 B1 * | 2/2003 | Bechtolsheim et al. ..... 370/229 |

OTHER PUBLICATIONS

Feng, Wu-Chang et al. Adaptive Packet Marking for Maintaining End-to-End Throughput in a Differentiated-Services Internet, IEEE, Oct. 1999.*
Clark et al., "Explicit Allocation of Best-Effort Packet Delivery Service", IEEE, Aug. 1998.*
IEEE/ACM Transactions On Networking, IEEE Inc. New York, US. vol. 7. No. 5, Oct. 1999, pp. 695-697, Feng W -C et al; Adaptive Packet Marking For Maintaining End-To-End Thoughput In A Differentiated-Services Internet.
IEEE/ACM Transactions On Networking, IEEE Inc. New York US, vol. 6, No. 4, Aug. 1, 1998, pp. 362-373, Clark D D et al: "Explicit Allocation Of Best-Effort Packet Delivery Service".

* cited by examiner

*Primary Examiner*—Chi Pham
*Assistant Examiner*—Melanie Jagannathan
(74) *Attorney, Agent, or Firm*—Squire, Sanders & Dempsey L.L.P.

(57) ABSTRACT

A method is disclosed for a router to provide random assignments of three priorities, each signifying a drop precedence, to packets on a per customer basis. The router determines a sending rate estimate. Then the router marks a packet a priority level based on the sending rate estimate.

26 Claims, 6 Drawing Sheets

METHOD AND APPARATUS FOR RANDOM PACKET MARKING FOR DIFFERENTIATED SERVICES

FIELD OF THE INVENTION

This invention relates generally to routing packets through a communication network of network entities, and more specifically, to a manner of marking packets from several data flows so as to achieve greater fairness in the further propagating of such packets through the communication network.

BACKGROUND OF THE INVENTION

In the Internet Engineering Task Force's (IETF) Differentiated Services architecture (S. Blake et al., "An Architecture for Differentiated Services", IETF RFC 2475) for providing IP Quality of Service (QoS), each IP packet carries a Differentiated Services Code-Point (DSCP) for the Differentiated Services (DS) field. DSCP is an index into a list of Per-Hop Behaviors (PHBs) that a packet may be entitled to at each DS-compliant node or router. A PHB may include a probability or preference to drop a packet of a certain class. By obtaining similar PHB at each network node using the DSCP as a tag or marker, an IP flow can realize end-to-end QoS.

In the IETF model, a source sends packets to a network, which may have wireless links. A first-hop router, also known as ISP router, places the appropriate DSCP in the DS field of each packet. If the source sends traffic, comprised of data packets in a flow, according to an agreed contract or policy, the packets are considered "in-profile" and marked with an appropriate DSCP. For example, those packets that are received according to the agreed contract, may be marked with a selected priority level from among several priority levels. Each priority level may have at least one DSCP associated with the priority level such that no DSCP is assigned more than a single priority level. Each of the priority levels denote a drop precedence, or color of packet. A high priority level is less likely to be dropped than a lower priority level. A subordinate priority level is any priority level that is not the highest priority level.

In the Three Color Marker (TCM) model (see J. Heinanen and R. Guerin, "A Two Rate Three Color Marker", Internet Draft, May 1999), a packet marked with a priority level of green is least likely to be dropped at a router, as compared to packets marked with priority levels of yellow or red. In the TCM model, the highest priority level is green. Red and yellow are subordinate priority levels. Thus it is advantageous in a network of network entities or routers that use multiple priority marked packets, e.g. TCM, for a user to have as many data packets in a flow marked green as possible, at least from the point of view of that user.

Unfortunately, since the resources at each router, and of the network generally, are limited, what is good for a single user, may have a negative impact on other users. If a single user monopolized the entire buffer queue at a router, that would leave the router unavailable to other users who intend to use the router. Marking a preponderance of data packets of a first user green, while marking a minority of data packets of a second user as green, would have a similar, but less pronounced effect. In that situation, a smaller percentage of the first user's packets would be dropped, (since green is low drop probability) as compared to the packets of the second user, which has a greater percentage of packets marked with the inferior priority levels of red and yellow.

Fairness is a measure of proportionally marking packets (with different colors corresponding to different packet-drop precedences) originating from a user of a customer consuming some bandwidth X, wherein the proportion of packets marked for the user of the customer is as close as possible to the proportion of packets marked of a second user of the customer, even though the second user may currently consume a bandwidth different than X. Necessarily, the proportion of packets marked, is a measure of the number of packets from a user marked over a period of time, compared to the overall set of packets of that user being considered for marking over the same period of time.

TCM tends to permit high priority marking proportions to vary considerably between users of a common customer, when compared at the same time. Such a disparity can lead to dissatisfaction of users, not entirely unlike that experienced by motorists who encounter a traffic jam.

SUMMARY OF THE INVENTION

A method of transmitting data on a network achieves greater fairness between packet flows from different sources. The proportion of packets to be marked a priority level, may be determined, in part, by a rate threshold.

An ability to establish a credit for good behavior, such as underutilized capacity, is achieved. The credit permits occasional bursts of packets above a threshold while the credit continues to satisfy a criterion. Such credits may be shared among several packet flows.

A further object of the invention is a means to adjust a probability of selecting a priority level on the basis of weighting multiple factors. This may enable a network operator to adjust between a preference for short duration adherence to a rule, and a preference for long duration adherence to a rule.

According to an embodiment of the invention, packets from a source reach a router. The router determines a sending rate estimate. The packet is then marked with a priority level based on the sending rate estimate.

The embodiment of the invention, may be operated in a diffserv or other network environment where one or more users, bargains with a ISP for carriage of packets over the network. The bargain struck results in setting parameters or rate thresholds to govern the rates of packets originating from a customer domain, wherein the one or more users may transmit packets from within IP addresses of the customer domain. Each user may have one or more IP flows associated with the user. An IP flow may be characterized by the source IP address, the destination IP address, the port numbers and the protocol id. Similar parameters may be used if the flow is an IPv6 flow. The sum of the packets of all users of a customer is known as the aggregate flow, or just 'aggregate'. An example of a customer would be Nokia Corporation. Another example would be a campus at a university, wherein the users may include faculty, staff and students. In the end, the customer may be regarded as a collective that has bargained for certain packet transmission qualities, and in particular, for rates of transmission and packet-drop probability. A user in this context is anyone who is apparently authorized to operate the equipment within the customer's domain that generates a flow.

A packet marker embodiment, known as a Random Packet Marker (RPM) marks packets on a flow-aggregate or aggregate basis rather than on per-flow basis. The marking is done as a function of the packet sending rate of the aggregate with respect to at least one rate threshold, e.g. a Committed Information Rate (CIR), established by prior agreement between the customer and the ISP. When the sending rate is at or below the CIR, all packets are sent as green; when it diverges from CIR, the probability of a packet being marked as green decreases, while the probability of being marked as yellow or red or other lower priority increases. A super rate threshold is one that is higher than at least one other rate threshold.

In comparison to TCM, testing shows that RPM provides a greater level of fairness across multiple flows, wherein fairness may be measured as the standard deviation of the proportion of packets marked green among the multiple flows.

DETAILED DESCRIPTION OF THE INVENTION

Figure 1:
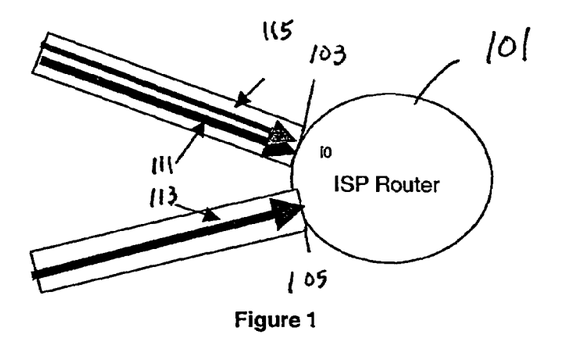
FIG. 1 is a block diagram of data flows traveling over links to a router according to an embodiment of the invention.

An embodiment of the invention is shown in FIG. 1. An ISP router 101, operated by an internet service provider (ISP), may have multiple input interfaces belonging to different customers, e.g. input interface i0 103 and input interface i1 105. For example, an AF class denoted by flow x 111, and flow y 113 may be specified to handle a first rate threshold, e.g. a Committed Information Rate (CIR), of 0.3 Mbps, and a second rate threshold, e.g. Peak Information Rate (PIR), of 0.4 Mbps. In this embodiment, PIR is a super rate threshold. Other higher rate thresholds could also be implemented. EF class traffic is denoted by flow z 115. The ISP router 101 employing differentiated services has to meter, using methods known in the art, the incoming traffic on the input interface i0 103, and mark the packets appropriately based on traffic compliance. The ISP router 101 need not consider whether each flow belonging to a customer is individually traffic compliant; instead, it may consider whether the entire customer traffic, e.g. flow x 111 and flow z 115, is compliant to the CIR of the customer and PIR of the customer or not. In such case, it is important to be able to provide per-aggregate marking algorithm in a router so that downstream routers are able to discard packets in accordance with the selected priority level set by a packet marker embodiment of the invention.

The packet marker of an embodiment relies on the availability of sending rate information, typically provided by a meter or metering tool. Such metering tools may include a time sliding window, which provides an estimate of sending rates, for example the aggregate sending rate of a customer, sometimes called s.

An embodiment of the invention, called random packet marking (RPM) may operate according to the following rules, wherein green, yellow and red denote unique DSCP bit patterns available to be set in a data packet, and the probabilities are for individual packets, based on rates determined by, e.g. Time Sliding Window (TSW):

Green marking probability equals:
  1 if s<=CIR, and
  CIR/s otherwise.
Yellow marking probability equals:
  0 if s<=CIR;
  1−(CIR/s) if CIR<s<=PIR; and
  (PIR−CIR)/s otherwise.
Red marking probability equals:
  0 if s<=PIR; and
  (s−PIR)/s otherwise.

Figure 2:
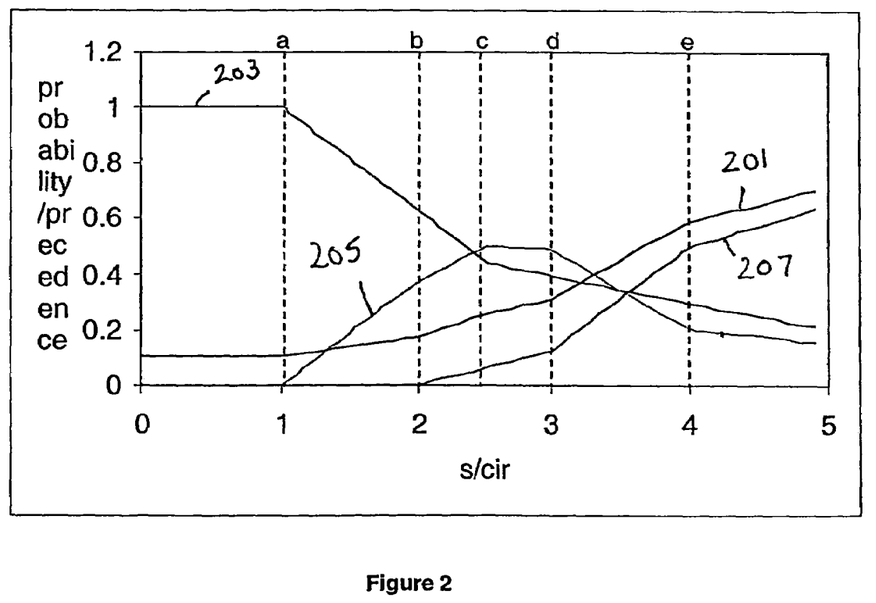
FIG. 2 is proportionality diagram showing the relative proportions of color markings of packets under varying rate multiples of the Committed Information Rate (CIR) according to an embodiment of the invention.

FIG. 2 is proportionality diagram showing the relative proportions of color markings of packets. The diagram is a proportionality diagram because proportions are measured on the vertical axis. The diagram shows the likelihood of marking a packet for each of the several priority levels according to the previously mentioned embodiment of the invention. The diagram also shows the likelihood of dropping packets 201 by a diffserv router downstream from the marker, so that although the proportions shown for 203, 205, and 207 are local to the node, 201 is the proportion collectively of packets dropped at one of possibly several nodes. In this example the PIR is set to be twice the CIR. The likelihood of dropping packets is known as the overall drop precedence 201. It may be calculated by:

$$\text{Overall Drop Precedence} = \text{low}*P_G(x) + \text{medium}*P_Y(x) + \text{high}*P_R(x),$$

where low, medium and high represent numeric probabilities of packet dropping associated with each of the three selected priority levels, and $P_G(x)$ 203, $P_Y(x)$ 205 and $P_R(x)$, 207 are the probabilities of marking green, yellow and red, respectively.

Figure 3:
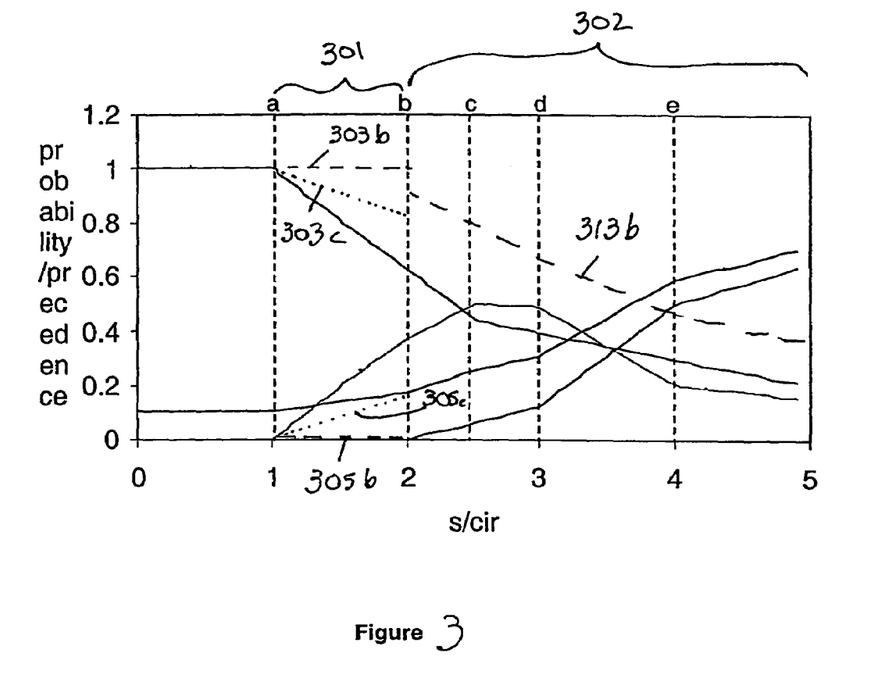
FIG. 3 is proportionality diagram showing the relative proportions of color markings of packets under varying rate multiples of the Committed Information Rate (CIR) according to another embodiment of the invention.

FIG. 3 is a proportionality diagram that shows operation of another embodiment of the invention. The embodiment may permit greater flexibility, by reducing the overall drop precedence of the previously described embodiment. The second embodiment modifies marking rules to bias, or improve the probability of marking green, while there is a sufficiently accumulated burst-size, b, built up for the customer (aggregate) and a first burst criterion 301 is satisfied, e.g. that s>CIR. The first burst criterion may also include a requirement that burst-size, b, is greater than a minimum burst, e.g. that b>0. By increasing the proportion of packets marked green, the best priority level, the overall drop rate at downstream routers is reduced. The burst-size, b, may be regarded as a credit to a customer for operating at rates below CIR. And like the first embodiment, the burst-size is accumulated for each customer so that flows of the customer are treated with high fairness. The practical effect this has in relation to FIG. 3, is that it increases the probability, to high, of marking a packet green, $P_G(x)$, to a burst-mode probability 303b, or high, while the burst credit, or burst-size remains above a threshold, e.g. 0. Naturally, if the probability of marking green, $P_G(x)$, is increased during this time, the probability of marking the packet a lower priority level 305$b$, e.g. yellow, $P_Y(x)$, must be reduced accordingly so that the sum of the probabilities is 1. An intermediate burst-mode probability $P_G(x)$ 303$c$ of marking green may be preferred if the ISP does not want to fix the burst-mode probability to 1 for the highest priority level or green. Similarly, the intermediate burst-mode probability for yellow $P_Y(x)$ 305$c$ may also be used.

If a sending rate satisfies a second burst criterion 302, the probability of marking green may decline, as sending rate increases, under a secondary function 313$b$. The secondary function 313$b$ according to the second embodiment may be in proportion to the inverse of the sending rate. The secondary function may be selected by a second burst criterion, such as, upon determining that s is as large as or much larger than PIR and burst-size is above a threshold.

Alternatively, the random element may be removed from the decision to mark green, and the packets may be marked green at a rate not exceeding the PIR or some multiple thereof. The selection of the remaining priority levels, e.g. red and yellow, for marking could be based on the probabilities provided under the operation of the first embodiment.

The burst credit may be established at a level, and may be restricted to a range, wherein no bursts are accumulated above the range, and no bursts are deducted below the range. The burst-size may be incremented in a fixed chunk, or variable chunk, and the burst size may be decremented in a fixed chunk or variable chunks. A suitable chunk setting could be the difference between the sending rate (expressed in bits per second) and CIR (expressed in bits per second) multiplied by inter-pkt-time. Inter-pkt-time may be the time measured between packets received. Inter-pkt-time may be a weighted average of times between several packet arrivals. Inter-pkt-time is also known as inter packet spacing. Another suitable chunk setting could be the number of bits in the packet to be marked.

The burst-size may be decremented by a chunk any time one or more of first burst criterion and second burst criterion is satisfied. The burst size may be incremented a chunk any time all burst criteria are not satisfied.

A more specific example of marking a received packet according to the second embodiment follows, using the language of TCM, wherein green is the highest priority level. All references of burst-size; sending rate; CIR; PIR; inter-pkt-time; pkt-size apply to a particular customer.

If the sending rate of the customer associated with the packet, s<CIR, then
  mark the packet green and burst-size=burst-size+(CIR−sending rate)*inter-pkt-time.

If CIR<s<PIR and burst-size>0, then
  mark the packet green; and burst-size=burst-size−pkt-size.

If sending-rate>PIR and burst-size>0 then
  mark the packet so that it and any prior packet marked green for the customer do not exceed the peak information rate; and burst-size=burst-size−pkt-size.

The values for (CIR−sending rate)*inter-pkt-time and pkt-size may each operate as a chunk. In order to mark packets green while not exceeding the PIR, a count of packets marked green by the marker may be maintained for an appropriately sized time period, or duration. A count of too many green packets in that period, would prohibit the current packet from being marked green, even though the burst-size, b, is greater than zero.

A convenient measure of a stream of data, is the instantaneous sending rate, which may be determined by a meter. Instantaneous sending rate may be determined by identifying two packets and dividing the data carried in the first packet by the duration between packet arrivals. The instantaneous sending rate may be in relation to packets fitting a certain criteria, such as, e.g. marked as green, in which case it is called the green instantaneous sending rate. The instantaneous sending rate may be a helpful gauge to measure performance of a marker, or of the network in general. In a sense, the instantaneous sending rate is a microscopic view of very few packets at some stage in the process of sending, receiving, metering or marking of packets.

It is possible when using some marking algorithms for the instantaneous sending rate for green packets to be higher than the CIR. Generally, this can occur with a minority of the green packets, but nevertheless the inter-pkt-time, or inter-packet spacing, between two packets may be shorter than an inter-packet spacing derived from the CIR, giving the appearance that a customer is getting a free ride beyond what was bargained for. To strictly prohibit green marked packets from having inter-packet spacing this small (i.e. in violation of the inter-packet spacing set by CIR), a marker could remark those packets marked green by the earlier embodiments. However, a packet marker doing this suffers the problem that averaging the data rate for all packets marked green often results a green rate well under the CIR. An example of this is in the situation where packets uniformly arrive every 8 ms, and minimum spacing, of CIR, is 27 ms. By remarking so that no more than 1 in four consecutive packets are green, the green inter-packet spacing is 32 ms, nearly 25% slower than CIR—clearly the customer is getting shortchanged when the incoming packets arrive just barely under the inter-packet spacing of CIR.

In order to avoid short-changing the customer, and permit longer term average rates to be closer to the sending rate CIR, a probability of keeping the green packets green using a soft inter-packet spacing step according to an embodiment of the invention would be:

$$P'(\text{green})=\exp((x-1)/a)$$

where x is the instantaneous green sending rate divided by CIR prior to remarking, and the remarking occurs provided the instantaneous green sending rate is larger than CIR. If instantaneous sending rate of two green packets prior to remarking does not satisfy this, then $P'(\text{green})=1$.

Soft inter-packet spacing, as generated by the soft inter-packet function, $P'(\text{green})$, can be helpful when data from a customer just starts up. Starting up the flows from the customer causes the aggregate sending rate (s) to fluctuate because no or few packets have arrived upon which to estimate s. At that time, an ISP may want a blend of the RPM, and the soft inter-packet spacing embodiments. In addition, the ISP may want to provide the customers rates according to soft inter-packet function, during times when traffic on the ISP is operating well below capacity, i.e. during off-peak hours.

The probabilities produced by the two embodiments—a first probability in the case of the RPM embodiment, and a second probability in the case of soft inter-packet spacing embodiment—may be blended together to provide a blended probability by weighting the probability for marking a packet according to each of the embodiments according to table 1.

TABLE 1

| Duration of use | Embodiment: $P_G$ (RPM) | Embodiment: P' (Soft inter-packet spacing) |
|---|---|---|
| At start-up | .01 weighting | .99 weighting |
| 5 seconds after start-up | .50 | .50 |
| 30 seconds after start-up | .95 | .05 |
| Steady state | 1.00 | 0.00 |

The blended probability, $P_b$, thus becomes:

$$P_b = w*P_G(x) + (1-w)*P'(\text{green});$$

where w may range between 0 and 1, and operates to weight each probability algorithm. Such a blend may be helpful to initialize the marking using P'(green) and later shift to $P_G(x)$, i.e. setting w=0 at startup, and shifting to a higher value of was time passes.

Figure 4:
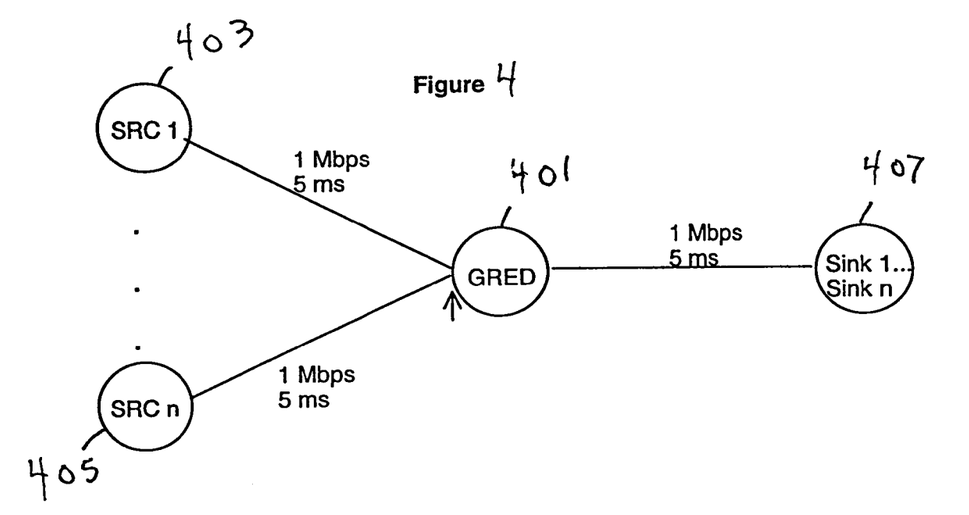
FIG. 4 is a simulation model for generating simulated results of an embodiment of the invention.
Figure 5:
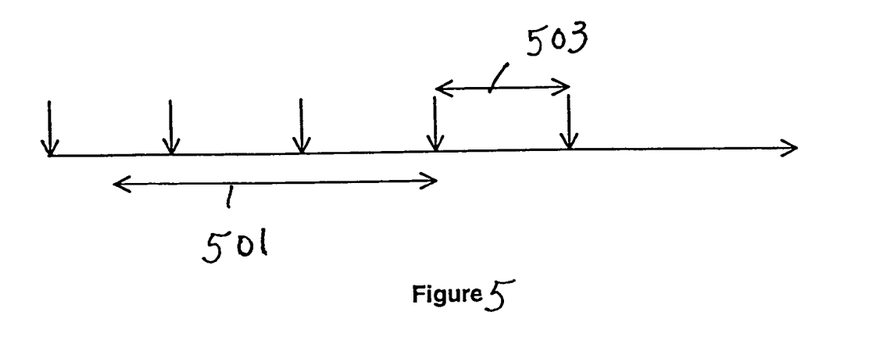
FIG. 5 is a comparison of a window length to a packet duration of a Time Sliding Window (TSW)

FIG. 4 shows a simulation model that is useful to compare the results of an embodiment with TCM. GRED 401 is a generalized RED, (S. Floyd and V. Jacobson, "Random Early Detection Gateways for Congestion Avoidance", IEEE/ACM Transactions on Networking, August 1993) for handling traffic with multiple drop preferences. Packet source 1 or user 1 403 provides at least one packet flow. Packet source n or user n 405, which may be one of several packet sources, also provides at least one packet flow. Sink 407 represents a network entity, e.g. a router or client, that receives the packet flows from packet source 1 403 and packet source n 405. The metering method used for the simulation is Time Sliding Window (TSW) with Exponential Weighted Moving Average (EWMA). In TSW, the sending rate may be calculated as:

$$\text{curr\_rate} = \frac{\text{win\_length} * \text{avg\_rate} + \text{pkt\_size}}{\text{win\_length} + \text{pkt\_time}}$$

where, in accordance with FIG. 5, win_length 501 is the past time taken into consideration for calculating the current sending rate. The relationship between win_length 501 and pkt_time 503 is shown in FIG. 5. The variable avg_weight, may be initialized at a default value, e.g. 0, and then modified as time goes by to be: avg_rate=(1−w)*curr_rate+ w*avg_rate; where w is some suitable weight so that more recent packets influence the value for avg_rate more than older packets.

Figure 6:
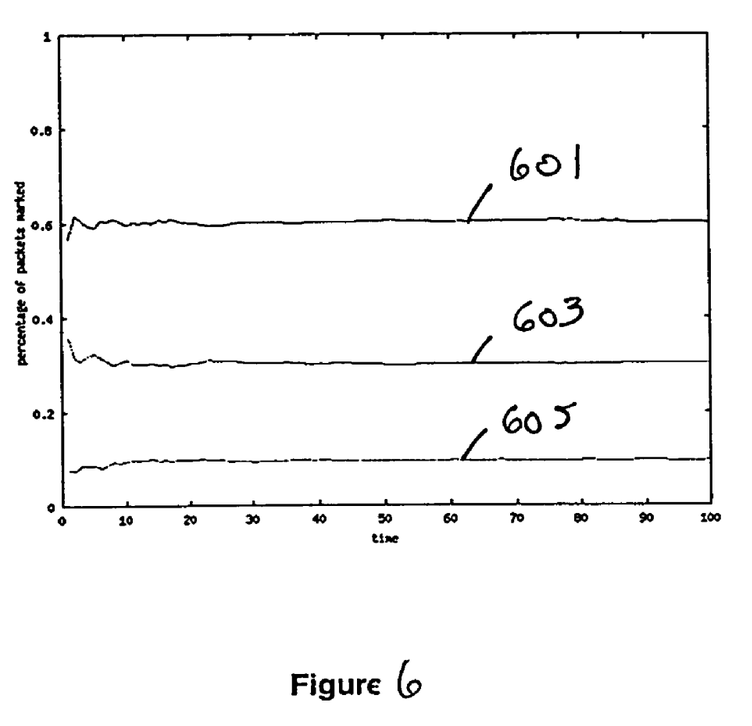
FIG. 6 is a proportionality diagram of a simulation of packet marking for a single TCP source.

FIG. 6 shows a single TCP flow, broken down into its constituent proportional representation of packets marked red, yellow and green. This kind of graph is a proportionality graph and is helpful to show the fluctuations over time of the proportion of the set of packets that are being marked with each color. One way to calculate the proportion for a given color, is to add up the total packets marked the given color over a duration, say long enough for 20 packets to be marked, then dividing by the total packets of the TCP flow for which there has been an opportunity to mark during that duration. If 3 packets are marked green, during an interval where 20 packets for the flow have been received, then the proportion of packets marked green is 0.15, or 15%. FIG. 6 shows a proportionality diagram of an embodiment of the invention when there is a single TCP source with the parameters mentioned in FIG. 3. The proportions are: the proportion of packets marked red 601; the proportion of packets marked green 603; and the proportion of packets marked yellow 605.

Figure 7:
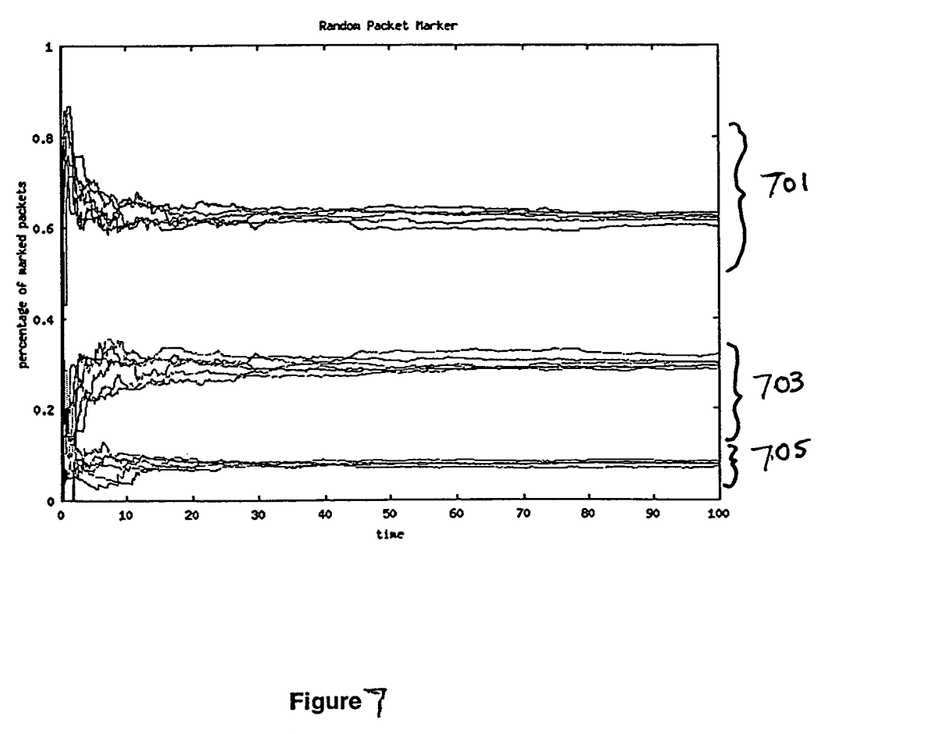
FIG. 7 is a proportionality diagram of a simulation of a packet marking for six TCP sources using an embodiment of the invention.

FIG. 7, shows a more complicated simulation—that of packet marking for six TCP flows of a customer using an embodiment of the invention. The proportion of packets marked red for each of the six TCP flows appears in a red group 701, wherein the proportion is the number of packets marked red as a ratio to the sum of incoming packets of the source. A grouping of six TCP flows marked green 703 are shown each as a proportion of the incoming packets of that TCP flow. A grouping of six TCP flows marked yellow 705 are shown each as a proportion of the incoming packets of that TCP flow.

Figure 8:
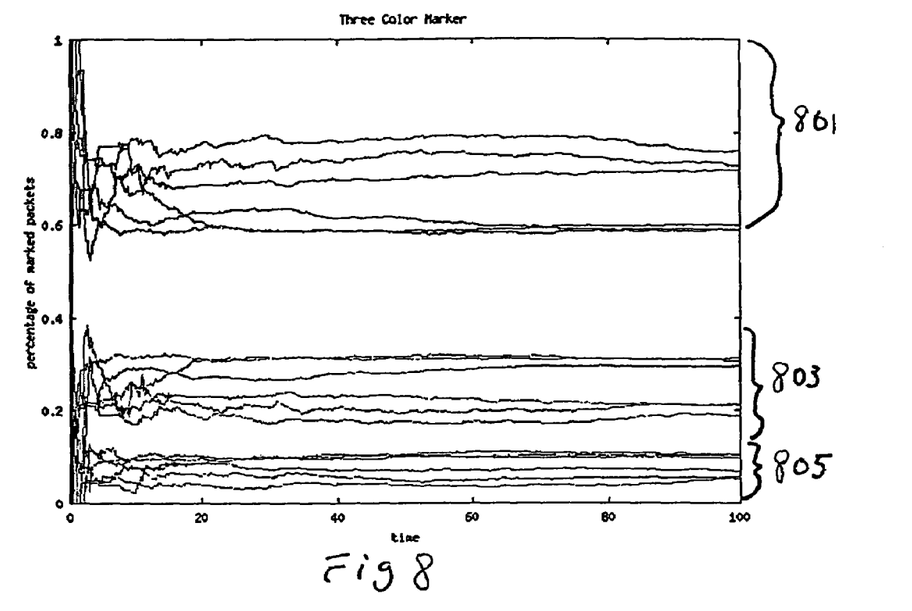
FIG. 8 is a proportionality diagram of simulated result of a packet marking for six TCP sources using a prior art method and apparatus.

FIG. 8 is a simulated result of a packet marking for six TCP flows using TCM, a prior art method and apparatus. By comparing FIG. 7 to FIG. 8 it can be seen that compared to TCM, the embodiment of the invention offers better fairness to flows. A grouping of six TCP flows marked red 801 are shown each as a proportion of the aggregate of the green, yellow and red marked packets of that TCP flow. A grouping of six TCP flows marked green 803 are shown each as a proportion of the aggregate of the green, yellow and red marked packets of that TCP flow. A grouping of six TCP flows marked yellow 805 are shown each as a proportion of the aggregate of the green, yellow and red marked packets of that TCP flow.

Figure 9:
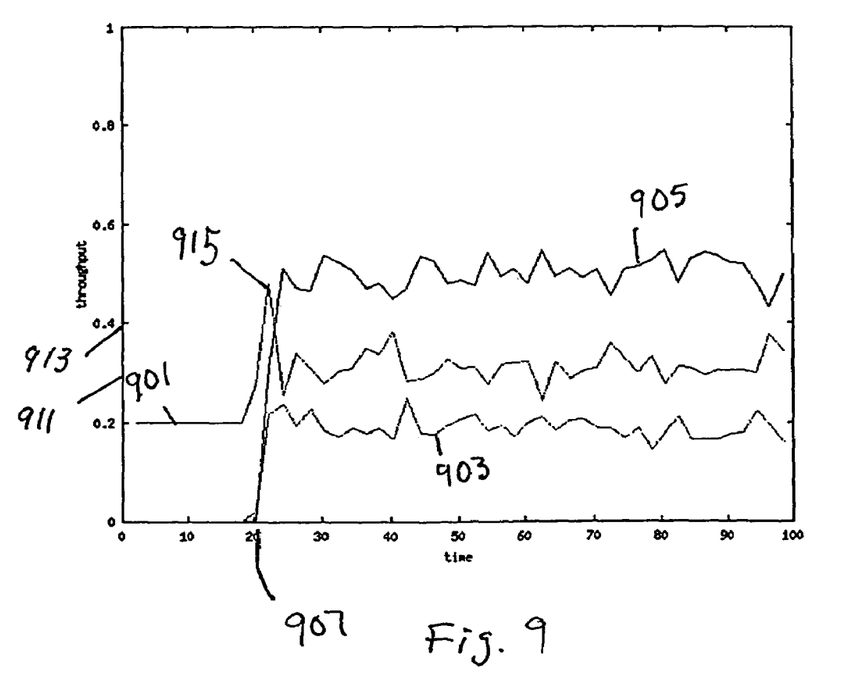
FIG. 9 is a proportionality diagram of a simulated result of a packet marking for a single TCP source using another embodiment of the invention.

FIG. 9 shows a simulation of how a packet burst can be supported by the second embodiment of the invention when the sending rate of a single Constant Bit Rate connection or user is increased from 0.2 Mbps to 1.0 Mbps at time 907. CIR 911 and PIR 913 are 0.3 Mbps and 0.4 Mbps respectively as before. The throughput of green marked packets 901, the throughput of yellow marked packets 903, and the throughput of red marked packets 905, is shown.

The second embodiment allows the connection or user to use green packets until a burst size is decremented to a level, and then marks the remaining packets based on the CIR and PIR values. Accordingly, a peak green rate occurs 915 that surpasses the CIR and PIR.

Although the invention has been described in the context of particular embodiments, it will be realized that a number of modifications to these teachings may occur to one skilled in the art. A number of metering methods in addition to TSW may be used. Thus, while the invention has been particularly shown and described with respect to specific embodiments thereof, it will be understood by those skilled in the art that changes in form and configuration may be made therein without departing from the scope and spirit of the invention.

What is claimed is:

1. A method, comprising:
   determining a sending rate estimate, s;
   determining any credits or debits for a packet stream including a plurality of data packets from a customer domain, a probability marking of the packet stream is improved while there is a sufficiently accumulated credit and when a first criterion is met; and
   probabilistically marking the packet stream to one of a plurality of priority levels based on the sending rate estimate, s, wherein the packet marking is on a flow-aggregate or aggregate basis for the packet stream including a plurality of data packets from the customer domain.

2. A method, comprising:
   determining a sending rate estimate, s;
   determining any credits or debits for a packet stream including a plurality of data packets from a customer domain, a probability marking of the packet stream is improved while there is a sufficiently accumulated credit and when a first criterion is met; and
   probabilistically marking the packet stream to one of a plurality of priority levels based on the sending rate estimate, s, marking comprises determining if the sending rate estimate is less than a first rate threshold and in response to a determination that the sending rate estimate is less than the first rate threshold, setting a probability of marking at least one data packet with a first selected priority level is one of a plurality of priority levels, wherein the packet marking is on a flow-aggregate or aggregate basis for the packet stream including a plurality of data packets from the customer domain.

3. The method of claim 2, further comprising
   in response to a determination that the s is less than the first rate threshold, incrementing a burst size.

4. A method, comprising:
   determining a sending rate estimate, s;
   determining any credits or debits for a packet stream including a plurality of data packets from a customer domain, a probability marking of the packet stream is improved while there is a sufficiently accumulated credit and when a first criterion is met; and
   probabilistically marking the packet stream to one of a plurality of priority levels based on the sending rate estimate, s, marking comprises determining if the sending rate estimate is between a first rate threshold and a second rate threshold and in response to a determination that the sending rate estimate is between a first rate threshold and a second rate threshold, setting a probability of marking a data packet with a subordinate priority level based on s, wherein the packet marking is on a flow-aggregate or aggregate basis for the packet stream including a plurality of data packets from the customer domain.

5. A method, comprising:
   determining a sending rate estimate, s;
   determining any credits or debits for a packet stream including a plurality of data packets from a source; and
   probabilistically marking the packet stream to one of a plurality of priority levels based on the sending rate estimate, s, marking comprises determining if the sending rate estimate is between a first rate threshold and a second rate threshold and in response to a determination that the sending rate estimate is between a first rate threshold and a second rate threshold, marking a data packet such that a rate of packets marked a subordinate policy level is no greater than 1−first rate threshold/s.

6. A method, comprising:
   determining a sending rate estimate, s;
   determining any credits or debits for a packet stream including a plurality of data packets from a source; and
   probabilistically marking the packet stream to one of a plurality of priority levels based on the sending rate estimate, s, marking comprises determining if the sending rate estimate is above a second rate threshold and in response to a determination that the sending rate estimate is above the second rate threshold, marking the packet such that a rate of packets marked the second priority level is at least (second rate threshold-first rate threshold)/s.

7. The method of claim 6, further comprising in response to a determination that the sending rate is above the second rate threshold, marking the packet such that a rate of packets marked a lowest priority level is at least (s−second rate threshold)/s.

8. A method, comprising:
   determining a sending rate estimate, s;
   determining any credits or debits for a packet stream including a plurality of data packets from a source; and
   probabilistically marking the packet stream to one of a plurality of priority levels based on the sending rate estimate, s;
   determining if the sending rate estimate is greater than a rate threshold;
   in response to a determination that the sending rate estimate is greater than the rate threshold, determining if a burst size is greater than a minimum burst; and
   in response to a determination that the burst size is greater than the minimum burst, marking the packet a first priority level.

9. The method of claim 8, further comprising in response to a determination that the burst size is greater than the minimum burst, decrementing the burst size.

10. A method, comprising:
    determining a sending rate estimate, s;
    determining any credits or debits for a packet stream including a plurality of data packets from a source; and
    probabilistically marking the packet stream to one of a plurality of priority levels based on the sending rate estimate, s;
    determining if the sending rate estimate is greater than the super rate threshold, determining if a burst size is greater than a minimum burst; and
    in response to a determination that the burst size is greater than a minimum burst, marking the packet a priority level based on a count of packets marked a highest priority level during a period.

11. The method of claim 10, further comprising in response to a determination that the burst size is greater than the minimum burst, decrementing the burst size.

12. An apparatus, comprising:
    a first determining unit configured to determine a sending rate estimate, s; and
    a second determining unit configured to determine any credits or debits for the packet stream, wherein a probability marking of the packet stream is improved while there is a sufficiently accumulated credit and when a first criterion is met; and
    a marking unit configured to probabilistically mark the packet stream to one of a plurality of priority levels based on the sending rate estimate, s, wherein the packet marking is on a flow-aggregate or aggregate basis for the packet stream including a plurality of data packets from a customer domain.

13. The apparatus of claim 12, wherein the mark unit comprises a determining unit configured to determine if the sending rate estimate is between a first rate threshold and a second rate threshold and another marking unit configured to mark a data packet such that a rate of packets marked a subordinate priority level is no greater than 1−(first rate threshold/s) in response to a determination that the sending rate estimate is between a first rate threshold and a second rate threshold.

14. An apparatus, comprising:
    a first determining unit configured to determine a sending rate estimate, s; and a second determining unit configured to determine any credits or debits for the packet stream, wherein a probability marking of the packet stream is improved while there is a sufficiently accumulated credit and when a first criterion is met; and a marking unit configured to probabilistically mark the packet stream to one of a plurality of priority levels based on the sending rate estimate, s, wherein the packet marking is on a flow-aggregate or aggregate basis for the packet stream including a plurality of data packets from a customer domain, the marking unit comprising a third determining unit configured to determine if the sending rate estimate is less than a first rate threshold; and a setting unit configured to set a probability of marking at least one data packet with a first selected priority level to a first value, responsive to a determination that the sending rate estimate is less than the first rate threshold, wherein said first selected priority level is one of a plurality of priority levels.

15. The apparatus of claim 14, further comprising a unit configured to increment a burst size, in response to a determination that the s is less than the first rate threshold.

16. An apparatus, comprising:
a first determining unit configured to determine a sending rate estimate, s; and
a second determining unit configured to determine any credits or debits for the packet stream, wherein a probability marking of the packet stream is improved while there is a sufficiently accumulated credit and when a first criterion is met; and
a marking unit configured to probabilistically mark the packet stream to one of a plurality of priority levels based on the sending rate estimate, s, wherein the packet marking is on a flow-aggregate or aggregate basis for the packet stream including a plurality of data packets from a customer domain, the marking unit comprising a third determining unit configured to determine if the sending rate estimate is between a first rate threshold and a second rate threshold; and
a setting unit configured to set a probability of marking a data packet with a subordinate priority level based on s, responsive to a determination that the sending rate estimate is between a first rate threshold and a second rate threshold.

17. An apparatus, comprising:
a first determining unit configured to determine a sending rate estimate, s; and
a second determining unit configured to determine any credits or debits for a packet stream including a plurality of data packets from a source, a probability marking of the packet stream is improved while there is a sufficiently accumulated credit and when a first criterion is met; and
a marking unit configured to probabilistically mark packet stream to one of a plurality of priority levels based on the sending rate estimate, s, the marking unit comprising a third determining unit configured to determine if the sending rate estimate is above a second rate threshold; and
a marking unit configured to mark the packet such that a rate of packets marked the second priority level is at least (second rate threshold−first rate threshold)/s, in response to a determination that the sending rate estimate is above the second rate threshold.

18. The apparatus of claim 17, further comprising another marking unit configured to mark the packet such that a rate of packets marked a lowest priority level is a least (s−second rate threshold)/s, in response to a determination that the sending rate is above the second rate threshold.

19. An apparatus, comprising:
a first determining unit configured to determine a sending rate estimate, s; and
a second determining unit configured to determine any credits or debits for a packet stream including a plurality of data packets from a source, wherein a probability marking of the packet stream is improved while there is a sufficiently accumulated credit and when a first criterion is met;
a marking unit configured to probabilistically mark the packet stream to one of a plurality of priority levels based on the sending rate estimate, s;
a third determining unit configured to determine if the sending rate estimate is greater than a rate threshold;
a fourth determining unit configured to determine if a burst size is greater than a minimum burst, in response to a determination that the sending rate estimate is greater than the rate threshold; and
another marking unit configured to mark the packet a first priority level, in response to a determination that the burst size is greater than a minimum burst.

20. The apparatus of claim 19, further comprising a decrementing unit configured to decrement the burst size, in response to a determination that the burst size is greater than the minimum burst.

21. An apparatus, comprising:
a first determining unit configured to determine a sending rate estimate, s; and
a second determining unit configured to determine any credits or debits for a packet stream including a plurality of data packets from a source, a probability marking of the packet stream is improved while there is a sufficiently accumulated credit and when a first criterion is met;
a marking unit configured to probabilistically mark the packet stream to one of a plurality of priority levels based on the sending rate estimate, s;
a third determining unit configured to determine if the sending rate estimate is greater than a super rate threshold;
a fourth determining unit configured to determine if a burst size is greater than a minimum burst, in response to a determination that the sending rate estimate is greater than the super rate threshold; and
another marking unit configured to mark the packet a priority level based on a count of packets marked a highest priority level during a period, in response to a determination that the burst size is grater than a minimum burst.

22. The apparatus of claim 21, further comprising a decrementing unit configured to decrement the burst size, in response to a determination that the burst size is greater than the minimum burst.

23. A method, comprising:
determining a first probability by using a first algorithm;
determining at least one second probability by using a second algorithm, the first algorithm being different from the second algorithm; and
weighting each probability so that each probability contributes to a net probability, wherein the weighting comprises determining any credits or debits for a packet stream including a plurality of data packets from a source, wherein a probability marking of the packet stream is improved while there is a sufficiently accumulated credit and when a first criterion is met, wherein the packet marking is on a flow-aggregate or aggregate basis for the packet stream including a plurality of data packets from a customer domain.

24. A computer program embodied within a computer readable medium, when executed the computer program includes means for marking a packet stream including a plurality of data packets from a source by performing:
- determining a sending rate estimate, s; and
- determining any credits or debits for the packet stream, wherein a probability marking of the packet stream is improved while there is a sufficiently accumulated credit and when a first criterion is met; and
- probabilistically marking the packet stream to one of a plurality of priority levels based on the sending rate estimate, s, wherein the packet marking is on a flow-aggregate or aggregate basis for the packet stream including a plurality of data packets from a customer domain.

25. A system for marking a packet stream including a plurality of data packets from a source, comprising:
- a metering tool for determining a sending rate estimate, s; and
- a determining means for determining any credits or debits for the packet stream, wherein a probability marking of the packet stream is improved while there is a sufficiently accumulated credit and when a first criterion is met; and
- a router for probabilistically marking the packet stream to one of a plurality of priority levels based on the sending rate estimate, s, wherein the packet marking is on a flow-aggregate or aggregate basis for the packet stream including a plurality of data packets from a customer domain.

26. An apparatus for marking a packet stream including a plurality of data packets from a source comprising:
- a metering tool for determining a sending rate estimate, s; and
- a determining component for determining any credits or debits for the packet stream, wherein a probability marking of the packet stream is improved while there is a sufficiently accumulated credit and when a first criterion is met; and
- a marking component for probabilistically marking the packet stream to one of a plurality of priority levels based on the sending rate estimate, s, wherein the packet marking is on a flow-aggregate or aggregate basis for the packet stream including a plurality of data packets from a customer domain.

* * * * *